INVENTOR
Charles TREFFNER

ATTORNEY

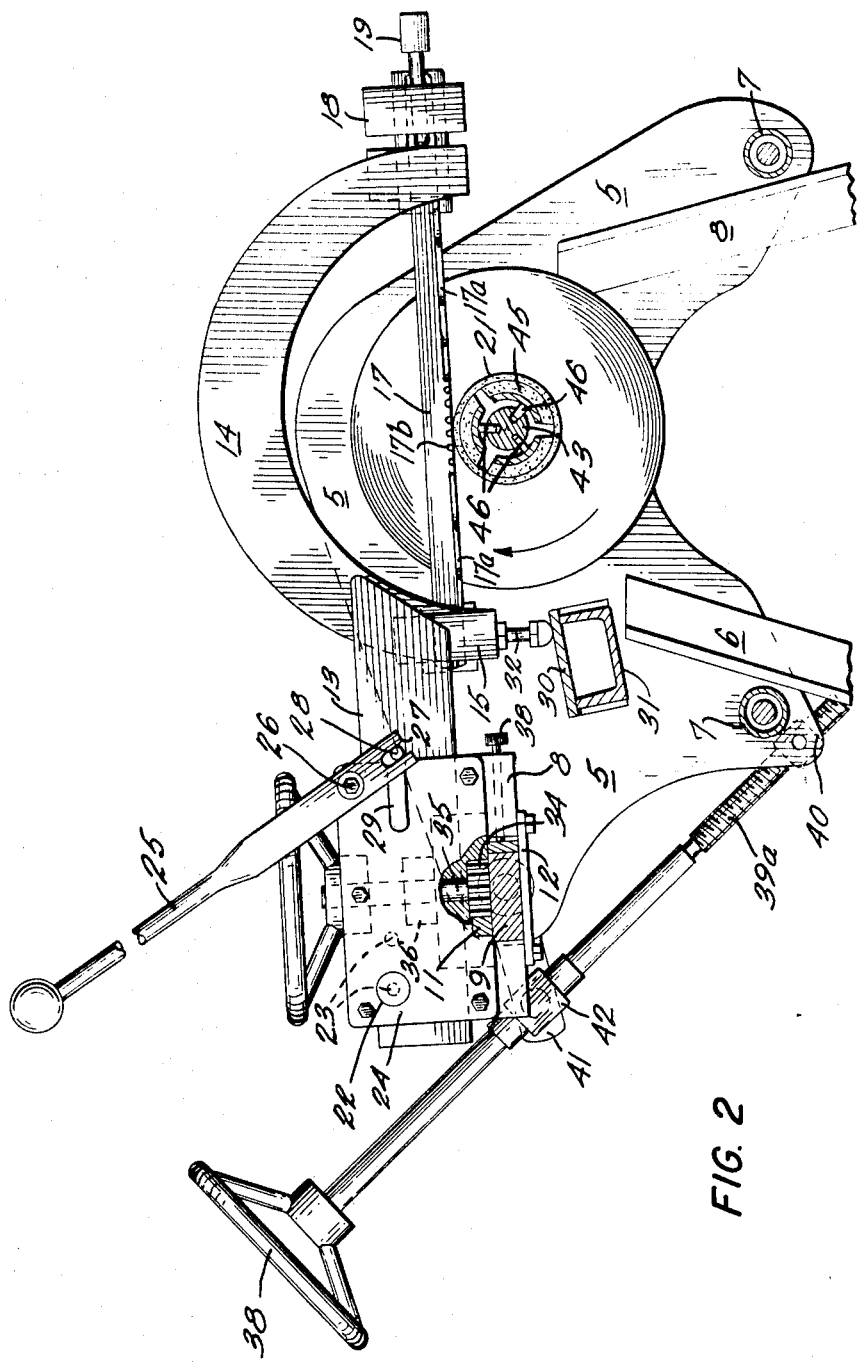

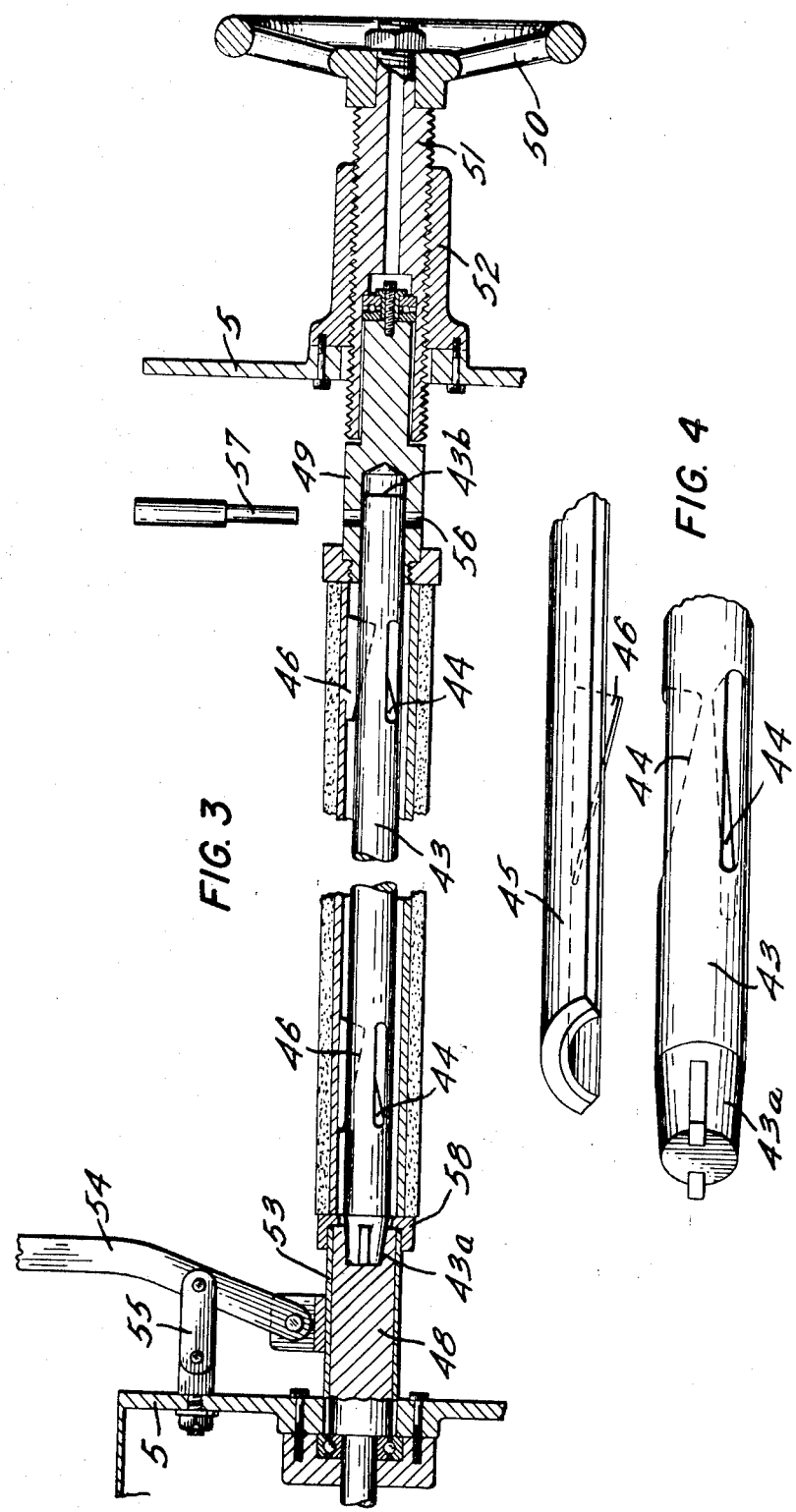

United States Patent Office 3,522,748
Patented Aug. 4, 1970

3,522,748
MACHINE FOR SLITTING PLASTIC FILM
AND THE LIKE
Charles Treffner, Belmore, New South Wales, Australia
(137 Boundary Road, Peakhurst, New South Wales
2210, Australia)
Filed Sept. 27, 1967, Ser. No. 670,899
Int. Cl. B23b 5/14, 1/00, 25/00
U.S. Cl. 82—101   9 Claims

ABSTRACT OF THE DISCLOSURE

A cutting machine having an expanding driven mandrel on which a hollow core of a roll of sheet material can be gripped and rotated against a stationary cutting blade. The blade is pivoted gradually towards the mandrel cutting through the sheet material and the core.

This invention relates to a machine for slitting rolled sheet material such as rolled plastic film to a required width on a master roll without rewinding, and refers particularly to the cutting means.

In the known forms of machines or appliances for cutting rolls of plastic film and sheet, there has been a tendency to distort the edges at the location of cutting, particularly in deep cuts, also heat has been generated at the cut which has been sufficient to fuse the cut material.

The present invention has been specially devised to provide improvements in a machine for slitting plastic film and the like particularly in respect of the cutting means whereby the above-mentioned disabilities are obviated, and deflection while cutting into large rolls of plastic material avoided. Even in cutting in large diameter rolls of plastic material excessive distortion to the cut edges is eliminated, and it is possible to cut narrow tapes to close tolerances. The cutting means are of simple and durable form and adjustment easily effected, and quick repetition of identical cuts provided. Other advantages will be apparent from the following description.

According to this invention, a machine for cutting plastic film and the like including end frames and supports spaced apart and connected together by longitudinal members and having a mandrel arranged across the top or near same to receive a roll of material thereon in a removable manner, and said mandrel being revolved from one end by suitable drive mechanism, and said machine being characterized by cutter means consisting of a cutter blade or saddle carriage (hereinafter termed "saddle") mounted for traversing longitudinally of said machine alongside the said mandrel said saddle being pivotally or hingedly arranged in position and having a cutter mounting frame extending out therefrom over said mandrel and adapted to mount a cutter of knife or blade form between the lower portion in a removable manner, and having at the outer end means for tensioning and securing said cutter blade in position.

Means may be included for adjusting the cutter mounting frame.

In some cases a guard may be pivotally or hingedly arranged in or on the frame for positioning about the cutter.

Stop means may be associated with the saddle to position same for the quick repetition of identical cuts and also for arresting the downward cutting movement.

For general use, very thin cutting blades may be used and the mounting thereof is such as to give rigidity thereto during cutting operations. However, single bevel blades can also be used and provide a near rigid knife for narrow tape cutting.

The mandrel is mounted in place in a removable manner and has means for engaging with the core of a roll of material to hold same in position, and such means being adapted for ready release. Said mandrel may be of a collapsible form as hereinafter described.

A circular type saw cutting attachment can be fitted to the cutter blade saddle and used for rough cutting purposes prior to finishing with the blade type cutting knife.

Having thus generally described the nature of the invention, particular reference will be made to the accompanying drawings, showing by way of illustration preferred embodiments thereof and in which:

FIG. 1 is a perspective view of a construction of the machine for slitting rolls of plastic film and the like;

FIG. 2 is an enlarged sectional view of said machine on line 2—2 of FIG. 1;

FIG. 3 is a sectional front elevation of the collapsible mandrel embodied in the machine in its collapsed position showing a portion of a plastic roll released;

FIG. 4 is an enlarged perspective view of portion of said mandrel showing means for expanding and collapsing same.

Figure 1:
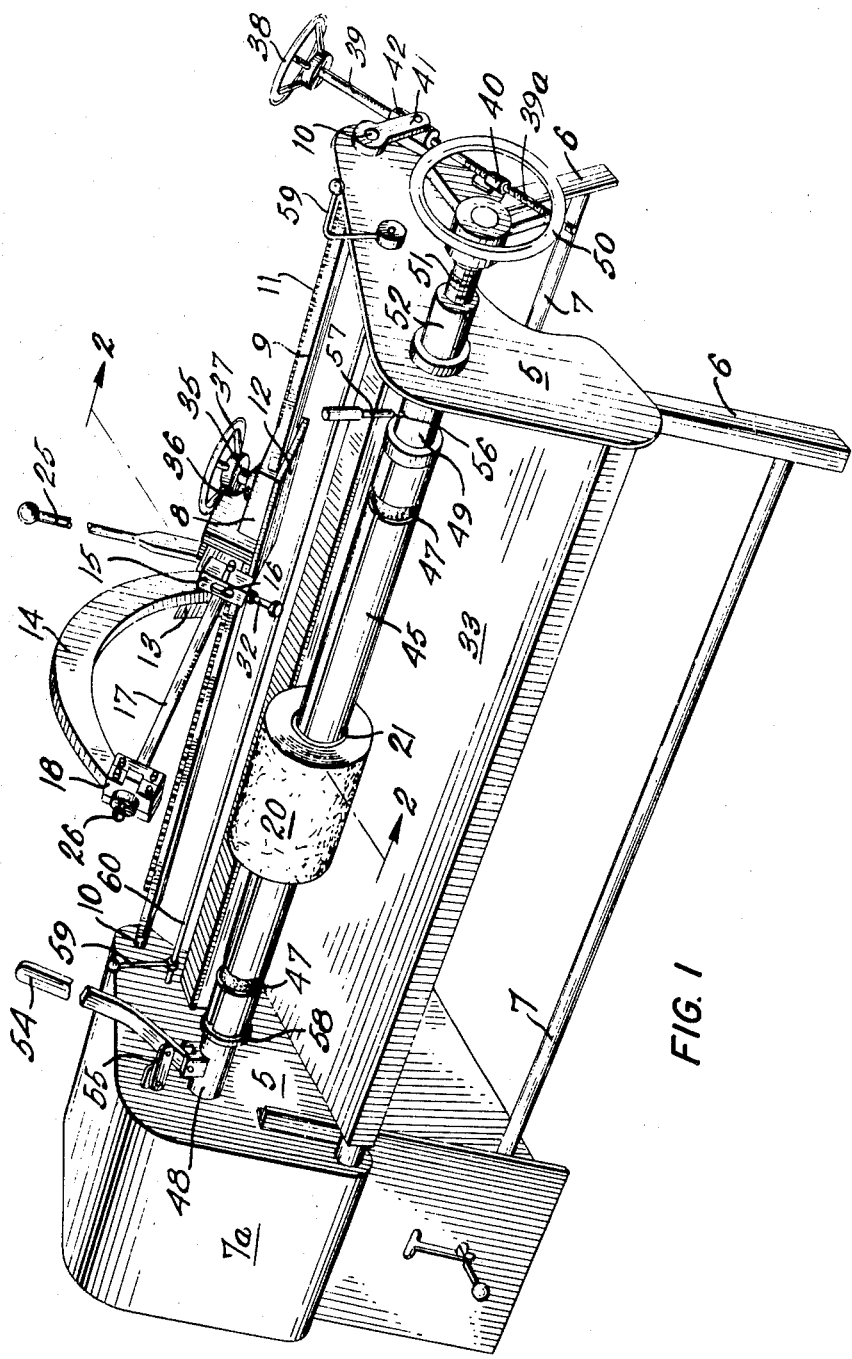

The end frames 5 and supports 6 of the machine are formed as A frames connected by spaced tubular rods 7 and the end from which the mandrel (later described) is driven houses the drive and transmission mechanism (not shown) of known form and contained within enclosing casing 7a.

The cutter blade saddle 8 consists of a slotted box-like casing slidably mounted for longitudinal movement on a pivoted slide bar 9 whose ends are rounded to form pivots at 10 (see FIG. 1), with a rack 11 affixed to said bar 9 extending between the end frames 5 of the machine with a retaining plate 12 affixed beneath the said slide bar 9 to the saddle 8.

This saddle 8 has a slidable support arm or bar 13 extending out on the mandrel side of the machine supporting one end of a bowed cutter blade mounting frame 14 having affixed to it a slotted block 15 to which is fitted a clamp plate 16 for securing one end of a cutter blade 17.

In the bowed cutter blade mounting frame 14, the cutter blade 17 extends between the ends in a chord-like manner and fits at the outer end in a securing bracket 18 extending outwardly of the frame end and provided with a tensioning screw 19 arranged axially thereof whereby it tensions the said bracket 18 and so the cutter blade 17 held therein.

The preferred form of cutter blade 17 is a dual-purpose one having a razor type cutting edge portion 17a on the underside for cutting plastic film of the roll indicated at 20 and a serrated type cutting edge portion 17b for cutting the cardboard core tube 21 of said roll 20. When it is required to bring the serrated portion of the blade 17b, for instance, into position to cut the cardboard core 21, the blade must be moved axially. The slidable support bar 13 which is slidably mounted in the saddle 8 includes two holes 23 corresponding to two separate axial positions of the blade 17. When it is required to change the position of the blade so as to cut through the plastic roll 20 or the core 21, the blade and blade frame are moved axially by aligning one of the holes 23 in the slidable support bar 13 into alignment with an index pin 22 which is pushed through the side face plate 24 of the cutter blade saddle 8.

The bowed cutter blade mounting frame 14 and cutter blade 17 are moved into either of the two mentioned positions after removing said index pin 22 from 23 in slidable support bar 13 and operating a hand lever 25 pivoted on a pin 26 (on one side of saddle 8) whose lower slotted end 27 engages a fixed pin 28 protruding from the side face of the slidable support bar 13 and capable of sliding within a slot 29 in the side face plate 24 moves slidable support bar 13 so that hole 23 in same is in proper alignment to receive the index pin 22.

The angular slope 30 of the top surface of a guide member 31 of box-shaped cross section affixed between the machine frames 5 enables a bottom stop 32 adjustably affixed to the lower surface of slotted block 15 to limit the downward movement of the cutter blade 17 and ensures that the razor edge of the cutter blade 17 does not cut into the cardboard core tube 21 of the plastic film roll 20 whilst rearward setting of the slidable support bar 13 positioned by index pin 22 causes the preset bottom stop 32 to engage the sloping surface 30 of the guide member 31 at a lower elevation, thus allowing the serrated edge portion of the cutter blade 17 to penetrate the cardboard core tube 21 of the plastic film roll 20 without cutting into the mandrel.

The beforementioned cutter blade saddle 8 slidably mounted over pivoted bar 9 has within it a pinion 34 (see FIG. 2) fitted to engage the rack 11 and is mounted on a spindle 35 which extends through a boss 36 on the outside of the casing and is fitted with a handwheel 37 for moving the cutter blade saddle 8 between the end frames 5 of the machine and is finally locked by a lockscrew 38 in required position for cutting the roll of plastic film 20.

The angularity of the saddle 8 is adjusted by feed means for cutting the roll of plastic film 20 and includes a handwheel 38 connected to a feed-screw 39 whose threaded portion 39a engages a nut 40 pivoted on one side of the machine frame 5 and intermediately a crank arm 41 whose one end is similarly pivoted to a bearing 42 on said feed-screw 39 and whose other end is affixed to the end of the pivoted slide bar 9 supported within the end frames 5 of the machine whose function is to lift or lower said cutter blade to or from the mandrel holding roll of plastic film 20.

The mandrel is of collapsible form (see FIGS. 3 and 4) comprising an inner shaft 43 having a series of tapered keyways 44 equally spaced around the periphery thereof and outer segmental pieces 45 of suitable length spaced around the periphery of inner shaft 43 having a series of protruding tapered keys 46 protruding on the inside surface coinciding with the beforementioned tapered keyways 44 on the inner shaft 43 and bedded therein, the outer segmental pieces 45 being held in position with suitably spaced flat elastic bands 47 around the outside surface.

The mandrel (see FIGS. 3 and 4 for details) is driven by a suitable drive mechanism (not shown) through a keyed tapered end 43a of the inner shaft 43 fitting into a correspondingly tapered end of the drive spindle 48 at one end of the machine whilst the other end is supported in a socket ended spindle 49 provided with end adjustment means controlled by a handwheel 50 fixed to a threaded spindle 51 through a correspondingly threaded bearing 52 affixed to the machine frame 5.

A sliding sleeve 53 fitted over the drive spindle 48 is adapted to be actuated by a hand lever 54 attached to frame 5 of the machine by pivoted links 55 after the machine is stopped and collapses expanding mandrel after threaded spindle 51 with handwheel 50 affixed is rotated to allow the end of mandrel inner shaft 43b to clear the hole 56 in socket ended spindle 49 and allow pin 57 to be inserted.

By operating hand lever 54, the cap 58 on end of sliding sleeve 53 causes endwise movement of outer segmental pieces 45 of the mandrel allowing their protruding tapered keys 46 to slide down their corresponding tapered keyways 44 allowing the grip on the plastic roll core 21 to be released.

The pin 57 is then removed from hole 56 and the socket ended bushed spindle 49 fully retracted to clear end 43b of mandrel inner shaft 43 allowing the keyed tapered end 43a of mandrel to be withdrawn from drive spindle 48 depositing mandrel with its finished plastic rolls 20 onto a machine table 33.

A suitable stop and start switch for the machine is controlled by hand levers 59 situated adjacent to the machine end frames 5 affixed to a support rod 60 free to pivot in the machine frames.

I claim:

1. An apparatus for cutting rolls of sheet material and the like comprising:
a frame;
a mandrel mounted for rotation on the frame;
the mandrel being driven by a suitable driving means;
a cutter mounted on said frame and extending laterally of said mandrel, the cutter having a bowed frame mounting a chord-like cutting blade, the cutter frame being pivotally mounted to the mandrel mounting frame whereby the cutter blade is adapted to contact a roll of sheet material on the mandrel, the blade having a fine cutting portion and a rough cutting portion, means for longitudinally adjusting the blade between a first position with the fine cutting portion of the blade adapted to be in contact with the roll and a second position with the rough cutting portion of the blade adapted to be in contact with the roll.

2. An apparatus as defined in claim 1 wherein saddle means are provided on the frame mounting the mandrel adjacent said mandrel and adapted for pivotal movement, said cutter frame being mounted on said saddle, by means of a support bar extending from said saddle.

3. An apparatus as defined in claim 2 wherein said support bar is slidably mounted within the saddle to provide for the longitudinal adjustment of said blade mounted in said cutter frame.

4. An apparatus as defined in claim 1 wherein the fine cutting portion of the cutter blade has a razor type cutting edge extending along the underside and the rough cutting of said cutting edge being serrated.

5. An apparatus for cutting rolls of sheet material and the like, comprising a frame, a mandrel mounted for rotation on said frame, the mandrel adapted to receive the roll of sheet material, the mandrel being driven by suitable driving means, a cutter mounted on said frame and extending laterally of said mandrel whereby the cutter is adapted to contact the rotating roll of sheet material on the mandrel, the mandrel includes a pair of pinion shafts adjustably supporting an intermediate shaft, the intermediate shaft mounting elongated segmented pieces adapted to expand diametrically in response to the pressure of said end pinion shaft, one of said end pinion shafts being driven, one of said end pinion shafts being axially adjustable, the roll of sheet material normally including a core.

6. An apparatus as defined in claim 2 wherein the saddle is mounted on a slide bar for controlled longitudinal movement thereon while the slide bar is pivotally mounted at its ends to the frame and control means are provided for controlling the pivoting movement of the slide bar.

7. An apparatus as defined in claim 5 wherein the intermediate shaft is provided with a series of tapered longitudinal keyways and at least two outer segmental pieces adapted to be fitted around the periphery of said intermediate shaft and having a series of protruding tapered keys on the inside surface coinciding with the tapered keyways on said intermediate shaft, means normally holding them in position on the shaft, and means arranged at the non-driven end of said inner shaft whereby endwise pressure is exerted on the said outer segmental pieces and expands same to grip the core of a roll of sheet material mounted thereon, and said latter means also effecting release of the said inner shaft.

8. An apparatus as defined in claim 7 wherein the driven pinion shaft has a slidable sleeve arranged thereover and is adapted to contact the outer segmental pieces of the mandrel for contracting same when the mandrel is stopped, said slidable sleeve being operatively connected to a hand lever mounted on a fixed part of the machine frame at the drive end of said mandrel.

9. An apparatus as defined in claim 8 wherein the non-driven end of the inner shaft is rotatably mounted in a socket ended spindle slidable on said shaft for expanding said outer segmental pieces, said socket spindle being rotatably mounted in a threaded spindle engaging in a thrust bearing affixed to the other frame end, said threaded spindle having an operating hand wheel whereby it can be advanced or retired.

References Cited

UNITED STATES PATENTS

| | | | |
|---|---|---|---|
| 802,545 | 10/1905 | Ames | 82—100 |
| 1,655,588 | 1/1928 | Baumann | 82—101 X |
| 2,720,132 | 10/1955 | Layne et al. | 82—44 |

ANDREW R. JUHASZ, Primary Examiner

J. F. COAN, Assistant Examiner

U.S. Cl. X.R.

82—44, 47